United States Patent [19]

Horton et al.

[11] Patent Number: 4,707,851
[45] Date of Patent: Nov. 17, 1987

[54] REMOTE ISOLATION TEST APPARATUS

[75] Inventors: Harold E. Horton, St. Petersburg; Joseph B. Roberts, Tampa, both of Fla.

[73] Assignee: General Telephone Co. of Florida, Tampa, Fla.

[21] Appl. No.: 924,539

[22] Filed: Oct. 29, 1986

[51] Int. Cl.⁴ .................. H04M 1/24; H04M 3/28
[52] U.S. Cl. .......................... 379/29; 379/30
[58] Field of Search ............. 379/30, 29, 399, 387

[56] References Cited

U.S. PATENT DOCUMENTS

| 4,169,220 | 9/1979 | Fields | 379/29 |
| 4,434,328 | 2/1984 | Fields | 379/30 |
| 4,550,225 | 10/1985 | Lynch et al. | 379/29 |

Primary Examiner—Stafford D. Schreyer
Attorney, Agent, or Firm—John A. Odozynski; Peter Xiarhos

[57] ABSTRACT

A remote isolation apparatus includes double-position switch for selectively coupling or isolating a telephone company central office and a multi-wire subscriber line. The switch operates according to a remotely originated activating signal so that, until the switch is operated, the central office is connected to the subscriber line through normally closed contacts. When the switch is operated, the central office TIP and RING leads are coupled to a reference terminal, and the central office is isolated from the subscriber line.

The apparatus includes circuitry for detecting the application of an activating signal to the line and for optically coupling a resulting trigger signal to a pair of monostable timers. The timer output pulses are arranged so that the relay is energized subsequent to the removal of the activating signal and remains energized during an interval established by the relative durations of the timer output pulses.

21 Claims, 2 Drawing Figures

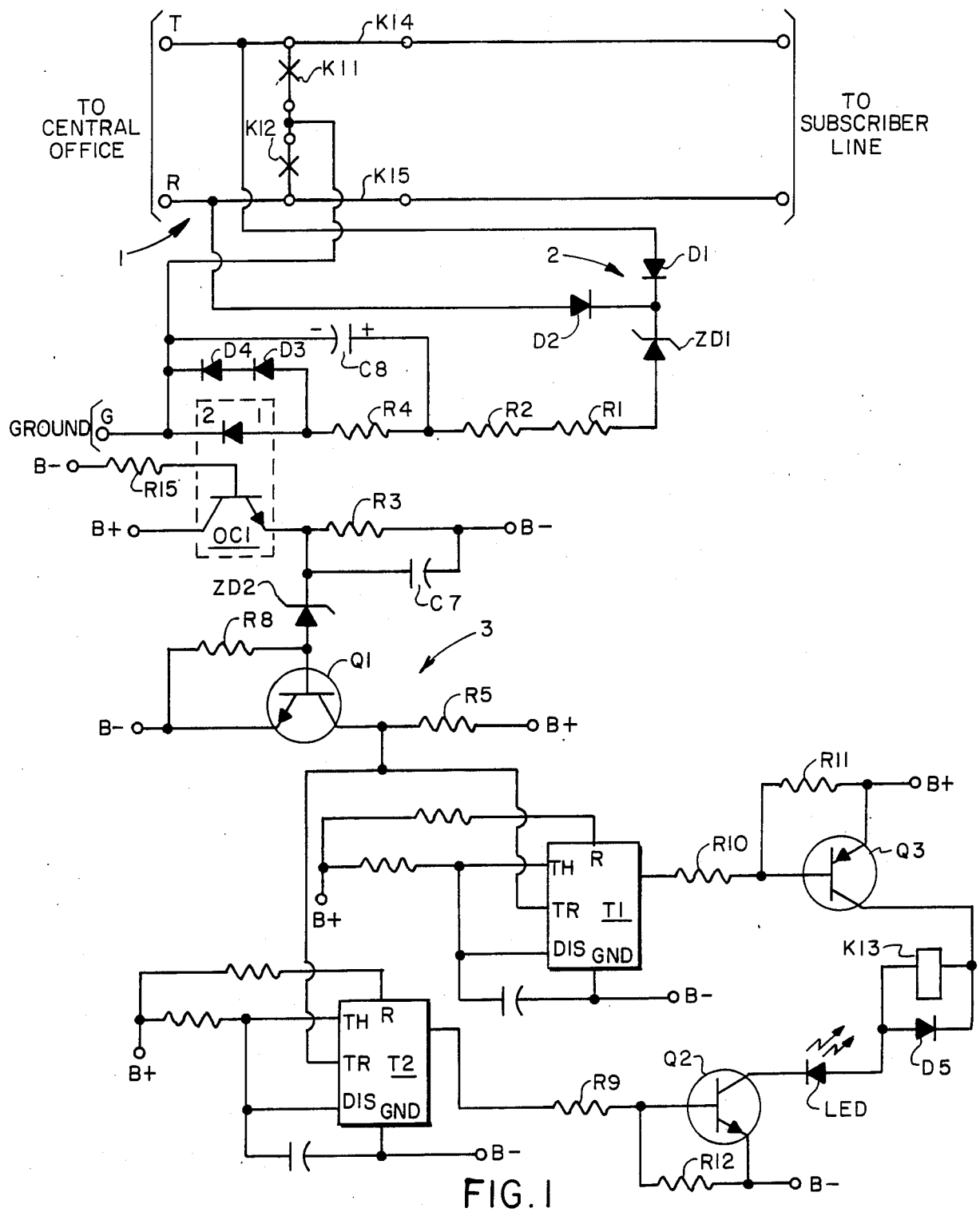

REMOTE ISOLATION TEST APPARATUS

TECHNICAL FIELD

This invention relates to electrical apparatus for performing selected tests on a multi-wire telephone circuit and, more particularly, to an apparatus that allows the central office to be selectively isolated from a selected subscriber line so that the line may be examined for short-circuit conditions such as may result from a lighting surge.

BACKGROUND OF THE INVENTION

In order to properly maintain the operation of a telephone system, it is desirable to monitor electrical characteristics, such as the loop resistance and DC balance, of the multi-wire subscriber line that connects customer-premises equipment to a central office switch.

Heretofore, these characteristics have been monitored by test equipment located at a central test site. The equipment requires service personnel at the customer premise, or some other location remote from the test site, in order to make connection, under direction from the test site, between the various leads which constitute the subscriber line and specified reference terminals, such as ground. The subject invention mitigates these requirements by employing test apparatus to effectuate the necessary connections between the TIP (T) and RING (R) leads at the customer premises under remote control from the test site.

In addition, it is ofttimes desirable to be able to isolate the central office line from the subscriber line so as to detect and determine the location of short-circuit conditions that may result from lightning surges or similar aberrant conditions.

DISCLOSURE OF THE INVENTION

The above and other objects, advantages and capabilities are achieved in one aspect of this invention by a remote isolation test apparatus for a subscriber line.

The apparatus includes a double-position switch having at least one pole for coupling to the central office. Associated with the pole are a normally closed contacting portion for selectively coupling the pole to a particular subscriber line and a normally open contacting portion for selectively coupling the pole to a reference terminal. Operation of the contacting portions is determined by a signal applied to a control portion. Circuitry coupled to the line detects an activating signal and generates an isolated signal in response thereto. The isolated signal is in turn coupled to a triggering circuit.

A first timer and a second timer, each having an input coupled to an output of the trigger circuit, provide respective first and second pulses. The pulses are initiated substantially coincidentally with and in response to a specific component of the activating signal and are characterized by respective first and second pulse durations.

A combining circuit has inputs coupled to the outputs of the first and second timers and an output coupled to the control portion of the switching means so that the switching means operates to isolate the central office from the subscriber line subsequent the occurrence of the activating signal. This condition persists for a duration dependent on the relative durations of the first and second pulses.

DESCRIPTION OF THE DRAWINGS

FIG. 1 is a schematic diagram of the subject test apparatus.

FIG. 2 depicts the expected appearance of significant waveforms at specific points in circuitry comprised by the invention.

DESCRIPTION OF A PREFERRED EMBODIMENT

For a better understanding of the subject invention, together with the objects, advantages and capabilities thereof, refer to the following description and appended claims, in conjunction with the accompanying drawings.

Referring now to FIG. 1, the subject invention can be seen to include switching means 1 in the form of a relay K1. The relay includes a pair of normally open contacts, K11 and K12, coupled across the TIP (T) and RING (R) leads of the two-wire subscriber line. K11 is coupled between (T) and ground, while K12 is coupled between ground and (R).

K1 also includes a pair of normally closed contacts, K14 and K15. As shown in the drawing, these contacts normally couple the central office (T) and (R) leads through their associated pole terminals to the subscriber line. However, under contemplated test conditions it may be desirable to energize the relay so as to isolate the central office from the subscriber line. For example, it may be desirable to detect and determine the location of suspected short-circuit conditions as may result from a lightning surge. To that end relay K1 may be a Form C configuration so that the connection to the subscriber line is broken before the connection of the (T) and (R) leads to the reference terminal is made. Contactin operation of K11 and K12 is determined by the current flowing through control portion K13, that is, through the relay coil.

In general, the subject apparatus is intended to detect the presence of an activating signal superimposed on either the (T) or (R) lead and to appropriately open contacts K14 and K15 and close contacts K11 and K12 in response thereto. In practice the activating signal may assume the form of a substantial DC voltage (100 volts DC, minimum) but other forms of activating signals are of course contemplated by the invention.

The activating signal is detected by a detecting circuit 2 that includes diodes D1 and D2, having anodes respectively coupled to the (T) and (R) leads and cathodes connected in common to the cathode of Zender diode ZD1. ZD1 effectively establishes threshold level for the activating signal so that low-level signals are ineffective to energize K1. The anode of ZD1 is coupled through a series string of resistors R1, R2 and R4 to an optical coupler OC1. Specifically, the resistor string is coupled to an anode of an LED, and the cathode of the LED is coupled to ground. A pair of diodes, D3 and D4, are coupled across the LED so as to limit the maximum voltage applied to the LED. A capacitor C8 is connected from the junction of R2 and R4 to ground.

Operation of the detecting circuit is such that the application of an activating signal at either (T) or (R) causes ZD1 and, hence, the LED to conduct. The resulting optical signal is coupled to, but electrically isolated from the phototransistor of OC1 so as to render the phototransistor conductive. The phototransistor has a collector coupled to a positive reference potential, B+, and a base coupled through a resistor R15 to a negative reference potential, B−. In practice B+ and B− may assume values of 9 volts and 0 volts respectively. The emitter of the phototransistor is coupled through a parallel RC circuit, R3 and C7, to B−.

The isolated optical signal at the base of the phototransistor causes a positive-going trigger signal to be coupled to the input of a trigger circuit 3 that includes a Zener diode ZD2 and a transistor Q1. ZD1 has a cathode coupled to the emitter of the phototransistor and an anode coupled to the base of Q1. The base of Q1 is coupled through resistor R8 to B− and its collector through R5 to B+. Q1 emitter is coupled directly to B−.

In essence, the application of activating signal at either (T) or (R) ultimately causes Q1 to conduct and the voltage at the output of the trigger circuit, this is, at Q1 collector, to fall with respect to B+. Conversely, removal of the activating signal causes the voltage of Q1 collector to rise. The positive-going edge of the trigger pulse at Q1 collector triggers a pair of integrated circuit timers, T1 and T2, substantially coincidentally.

It should be noted that components R4, C8, R15, R3 and C7 introduce an intended delay between the appearance of an activating signal at either the (T) or (R) leads and the time at which the trigger input to timers T1 and T2 goes low. The delay is provided in order to permit prior or preliminary test procedures to be completed before relay K1 is energized. In addition, the lowpass filtering effect of these components provide a degree of immunity from spurious AC voltages applied between (T) and (R) or between either of those terminals and ground.

As shown in FIG. 2, the removal of the activating pulse initiates positive-going pulses at the respective outputs of T1 and T2. The duration of the pulses is determined by the values of passive components appended. For commercially available monostable timers such as the NE555 these values of appended passive component may be chosen to provide pulse durations ranging from milliseconds to months. With regard to the apparatus and function encountered here, T1 and T2 pulse durations may be assumed to be 12 and 30 seconds respectively.

As shown in FIG. 1, the outputs of T1 and T2 are appropriately coupled to the inputs of a combining circuit 4 that included PNP transistor Q3 and NPN transistor Q2, as well as associated resistors R9, R10, R11, and R12.

Because relay coil K13 is connected serially between the collectors of Q3 and Q2, the relay will be energized only when both Q3 and Q2 are conducting. As can be easily deduced from material explicated hereabove, conduction obtains only when the output of T1 is low and the output of T2 is high. As a result, a time delay is introduced between the time at which the activating signal is removed and the time at which the relay is initially energized. The delay is roughly equivalent to the pulse duration of T1, 12 seconds. Contact closure persists until the demise of the T2 output pulse, approximately 18 seconds.

Furthermore, the apparatus includes an LED coupled in series with relay coil K13 so as to provide a convenient visual indication of the operation of the equipment.

To reiterate, the subject remote isolation test apparatus permits electrical testing of a subscriber line to be conducted at customers' premises in a more efficient manner than had been heretofore attainable. In addition, the apparatus permits the subscriber line to be easily isolated from the telephone company central office when it is desirable to do so. Furthermore, although the apparatus has been described in the context subscriber line maintenance, it has clear applicability to other types of equipment.

Accordingly while there has been shown and described what is at present considered to be a preferred embodiment of the invention, it will be obvious to those skilled in the art that modifications therein and adaptions thereto are contemplated and are within the scope of the invention as defined by the claims appended.

What is claimed is:

1. A remote isolation test apparatus for a telephone line, the apparatus comprising:

double position switching means including a pole terminal for coupling to the central office, including a normally closed contacting portion for coupling to a subscriber line and including a normally open contactiing portion for coupling to the reference terminal, said double position switching means further including a control portion at which a signal may be applied for selectively isolating the central office from the subscriber line and for connecting the central office to the reference terminal, detecting means coupled to the pole terminal for detecting an activating signal and for generating an isolated signal in response thereto, a triggering circuit having an input and an output, coupling means for coupling the isolated signal to an input of the triggering circuit, a first timer and a second timer, each having an input coupled to an output of the trigger circuit, said first timer for providing a first pulse at an output thereof and said second timer for providing a second pulse at an output thereof, said first and second pulses initiated substantially coincidentally and in response to the activating signal and characterized by respective first and second pulse durations, and a combining circuit having inputs coupled to the outputs of the first and second timers and an output coupled to the control portion of the switching means so that the switching means operates to isolate the central office from the subscriber line subsequent the occurrence of the activating signal, said isolating condition to persist for a duration dependent on the relative durations of the first and second pulses.

2. A test apparatus as defined in claim 1 wherein the detecting means includes a threshold device coupled between the multi-wire line and the coupling means.

3. A test apparatus as defined in claim 2 wherein the detecting means includes circuitry for providing immunity from spurious signals.

4. A test apparatus as defined in claim 3 wherein the threshold device is a Zener diode.

5. A test apparatus as defined in claim 1 wherein said coupling means includes an LED optically coupled to a phototransistor.

6. A test apparatus as defined in claim 5 wherein said coupling means includes circuitry for providing immunity from spurious signals.

7. A test apparatus as defined in claim 1 wherein the triggering circuit includes a Zener diode coupled to a transistor so that the conductivity of the transistor is substantially established by the occurrence of an isolated signal at the input of the triggering circuit.

8. A test apparatus as defined in claim 1 wherein the first timer provides a first pulse of a predetermined duration so as to establish a time delay between the occurrence of an activation signal and the resulting energization of the switching means.

9. A test apparatus as defined in claim 8 wherein the second timer provides a second pulse of predetermined duration so as to establish the length of time interval during which the switching means is energized.

10. A test apparatus as defined in claim 1 wherein the combining circuit includes first and second transistors each having respective first, second, and third electrodes and wherein the first electrode of the first transistor is coupled to the output of the first timer, the first electrode of the second transistor is coupled to the output of the second timer, the second electrode of the first transistor is coupled to a first reference potential, the second electrode of the second transistor is coupled to a second reference potential and wherein the control portion of the switching means is coupled to both the third electrode of the first transistor and to the third electrode of the second transistor so that the switching means is energized only when both the first and the second transistors are conducting substantial current.

11. A test apparatus as defined in claim 10 further including an element for providing visual indication of operation concurrent with the energization of the switching means.

12. A test apparatus as defined in claim 11 wherein the element is a LED coupled to an output of the combining circuit.

13. A remote isolation test apparatus for a subscriber line, the apparatus comprising:
a switch including a pole portion for coupling to the central office (T) or (R) leads, including a normally closed portion for coupling to a subscriber line, and including a normally open portion for coupling to a reference terminal and which, when energized, effectively selectively isolates the central office for the subscriber line,
a Zener diode coupled at one end to the respective (T) and (R) leads so that the Zener diode is rendered conductive in response to an activating signal as may be applied to either or both said leads,
an optical coupler coupled between another end of the Zener diode and a trigger circuit, the optical coupler for providing an isolated signal to the trigger circuit in response to the application of an activating signal,
a pair of monostable timers each having trigger inputs coupled to an output of the trigger circuit, said timers triggered in response thereto so that the timers provide respective output pulses which are initiated substantially coincidentally with and in response to at least a specific component of the activating signal, and
a pair of complementary output transistors each having an input coupled to an output of one of the timers and outputs serially connected to a control portion of the switch so that the switch is energized only during a time interval determined by the relative durations of the respective output pulses provided by the timers.

14. An apparatus as defined in claim 13 wherein the switch is a relay having contacts coupled between the (T) and (R) leads and a coil connected between the outputs of the complementary transistors.

15. An apparatus as defined in claim 13 wherein the Zener diode is respectively coupled to the (T) and (R) leads through a pair of diodes.

16. An apparatus as defined in claim 13 wherein the trigger circuit contains a resistance-capacitance network for effecting a delay between the appearance of an activating pulse and the trigger output pulse and for providing a degree of immunity from spurious AC signals.

17. A remote isolation test apparatus for selectively isolating a subscriber line from a telephone company central office, said test apparatus comprising:
detecting means for detecting an activating signal and for developing a trigger signal in response thereto;
a trigger circuit;
isolating means coupled to the detecting means and to the trigger circuit for coupling the trigger signal to the trigger circuit while maintaining electrical isolation between the trigger circuit and the subscriber line;
a first monostable timer coupled to an output of the trigger circuit for providing a first output pulse of duration T1;
a second monostable timer coupled to an output of the trigger circuit for providing a second output pulse of duration T2; and
switching means having a control portion coupled to the first and second monostable timers and having contacting portions coupled between the central office and subscriber line for isolating the central office from the subscriber line in response to an activating signal.

18. A remote isolation test apparatus as defined in claim 17 wherein the isolating means includes a light-emitting diode and a phototransistor that are rendered conductive in response to the occurrence of an activating signal.

19. A remote isolation test apparatus as defined in claim 17 wherein the switching means is a relay having a control winding coupled between the first and second timers so that the relay is energized only when the first and second output pulses are of significantly unequal value.

20. A remote isolation test apparatus as defined in claim 19 wherein the control winding is coupled to the first monostable timer through a semiconductor device of a first conductivity type and to the second monostable timer through a semiconductor device of a second conductivity type, different from the first conductivity type.

21. A remote isolation test apparatus as defined in claim 17 wherein the relay includes a pole portion for coupling to the central office (T) or (R) leads, a normally closed portion for coupling to a subscriber line, and a normally open portion for coupling to a reference terminal.

* * * * *